United States Patent
Liu et al.

(10) Patent No.: US 11,277,773 B2
(45) Date of Patent: Mar. 15, 2022

(54) HANDOVER METHOD AND APPARATUS

(71) Applicant: DATANG MOBILE COMMUNICATIONS EQUIPMENT CO., LTD., Beijing (CN)

(72) Inventors: Aijuan Liu, Beijing (CN); Ye Zhou, Beijing (CN); Dajun Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/255,427

(22) PCT Filed: Apr. 24, 2019

(86) PCT No.: PCT/CN2019/084147
§ 371 (c)(1),
(2) Date: Dec. 23, 2020

(87) PCT Pub. No.: WO2020/001148
PCT Pub. Date: Jan. 2, 2020

(65) Prior Publication Data
US 2021/0144594 A1    May 13, 2021

(30) Foreign Application Priority Data
Jun. 26, 2018 (CN) .................. 201810672666.X

(51) Int. Cl.
*H04W 36/30* (2009.01)
*H04W 36/00* (2009.01)
*H04W 36/38* (2009.01)

(52) U.S. Cl.
CPC . *H04W 36/0016* (2013.01); *H04W 36/00837* (2018.08); *H04W 36/30* (2013.01); *H04W 36/385* (2013.01)

(58) Field of Classification Search
CPC ....... H04W 36/0016; H04W 36/00837; H04W 36/30; H04W 36/385
See application file for complete search history.

(56) References Cited

U.S. PATENT DOCUMENTS

| 2017/0359848 A1 | 12/2017 | Tenny et al. |
| 2020/0106663 A1* | 4/2020 | Yoo ........................ H04L 67/10 |

(Continued)

FOREIGN PATENT DOCUMENTS

| CN | 106162730 A | 11/2016 |
| CN | 107027153 A | 8/2017 |

(Continued)

OTHER PUBLICATIONS

CATT, "Discussion on further enhancement for disaggregated gNB scenario", 3GPP TSG RAN Meeting #80, La Jolla, US, Jun. 11-14, 2018, total 4 pages, RP-180921.

(Continued)

*Primary Examiner* — Barry W Taylor
(74) *Attorney, Agent, or Firm* — Kilpatrick Townsend & Stockton, LLP

(57) ABSTRACT

Disclosed in the present application are a handover method and apparatus, relating to the field of communications, and being used for reducing the interruption time of data transmission in a distributed unit DU handover process when the central unit control plane/central unit user plane CU-CP/CU-UP in a base station are separated, enhancing the user experience. In the handover method provided in the embodiments of the present application, a notification sent by the CU-CP to the CU-UP not only carries tunnel switching instruction information, but also comprises maintenance instruction information, the maintenance instruction information instructing the CU-UP to continue sending downlink data by means of the original downlink tunnel, such that downlink data can still be received when the user device is (Continued)

not yet connected to a target DU, thereby reducing the interruption time of data transmission during the DU handover process, and enhancing the user experience.

20 Claims, 6 Drawing Sheets

(56) References Cited

U.S. PATENT DOCUMENTS

2020/0113008 A1* 4/2020 Luo ................. H04W 76/12
2020/0351963 A1* 11/2020 Shuai ................ H04L 67/322

FOREIGN PATENT DOCUMENTS

CN 107347199 A 11/2017
WO 2018029854 A1 2/2018

OTHER PUBLICATIONS

Samsung et al.,"Mobility procedures with high layer split", 3GPP TSG-RAN WG3 Meeting #98, Reno, USA, Nov. 27- Dec. 1, 2017, total 12 pages, R3-174611.
3GPP TR 38.806 V1.0.0, 3rd Generation Partnership Project;Technical Specification Group Radio Access Network Study of separation of NR Control Plane (CP) and User Plane (UP) for split option 2; Release 15; total 23 pages, Dec. 2017.
3GPP TR 38.806 V15.0.0, 3rd Generation Partnership Project; Technical Specification Group Radio Access Network Study of separation of NR Control Plane (CP) and User Plane (UP) for split option 2; Release 15, total 22 pages, Dec. 2017.
3GPP TS 38.401 V0.4.1, 3rd Generation Partnership Project;Technical Specification Group Radio Access Network NG-RAN;Architecture description Release 15, total 25 pages, Oct. 2017.
3GPP TS 38.401 V15.2.0, 3rd Generation Partnership Project; Technical Specification Group Radio Access Network NG-RAN; Architecture description Release 15, total 39 pages, Jun. 2018.

* cited by examiner

HANDOVER METHOD AND APPARATUS

This application is a national phase entry under 35 U.S.C. § 371 of International Application No. PCT/CN2019/084147, filed on Apr. 24, 2019, which claims the priority of Chinese Patent Application No. 201810672666.X, filed with the China National Intellectual Property Administration on Jun. 26, 2018 and entitled "Handover Method and Apparatus", the entire content of which is incorporated herein by reference.

FIELD

This application relates to the field of communication technologies, and in particular to a handover method and apparatus.

BACKGROUND

In the LTE (Long Term Evolution) system, the wireless access network is composed of multiple base stations, the base stations are connected to the core network through S1 interfaces, and the base stations are connected to each other through X2 interfaces. In the 5G system, a Central Unit (CU) is introduced for centralized control and scheduling, and the Radio Resource Control (RRC) function and some functions of the layer 2 or/and layer 1 are deployed in the CU, while other functions of the base stations are deployed on the Distributed Unit (DU). Based on this, the interfaces (NG) between the base stations and the core network end at the CU, and the interfaces (Xn) between the base stations also end at the CU. In addition, the 5G system further introduces the separation of Control Plane (CP)/User Plane (UP), that is, the CU is further divided into a Central Unit-Control Plane (CU-CP) and a Central Unit-User Plane (CU-UP), so as to achieve the better management and communication performance.

BRIEF SUMMARY

Embodiments of the application provide a handover method and apparatus, so as to reduce the interruption time of data transmission during the DU handover process and improve the user experience in a scenario where the CU-CP/CU-UP are separated in a base station.

Embodiments of the application provide a handover method applied to an access network device in which a CU and a DU are separated. The CU includes a CU-CP and a CU-UP, and the method includes: determining, by the CU-CP, a target DU for a user equipment; and sending, by the CU-CP, a notification to the CU-UP.

The notification includes: tunnel switching indication information for indicating the CU-UP to switch a source downlink tunnel of the user equipment to a downlink tunnel corresponding to the target DU; and holding indication information for indicating the CU-UP to continue sending downlink data through the source downlink tunnel.

With this method, the notification sent by the CU-CP to the CU-UP not only carries the tunnel switching indication information, but also carries the holding indication information. Through the tunnel switching indication information, the CU-UP can be indicated to switch the source downlink tunnel of the user equipment to the downlink tunnel corresponding to the target DU, so that the user equipment can receive downlink data sent by the target DU after the user equipment is successfully connected to the target DU; and through the holding indication information, the CU-UP can be indicated to continue sending the downlink data through the source downlink tunnel, so that the user equipment can still receive downlink data when it is not connected to the target DU, thereby reducing the interruption time of data transmission during the DU handover process and improving the user experience.

In one embodiment, the holding indication information includes: indication information of temporarily holding the source downlink tunnel, which is used to indicate the CU-UP to temporarily hold the source downlink tunnel and continue sending downlink data through the source downlink tunnel; or information of a reason for switching the downlink tunnel of the user equipment being a cell handover, which is used to indicate the CU-UP to continue sending downlink data through the source downlink tunnel when the downlink tunnel is switched due to the cell handover.

Therefore, when the content of the holding indication information is set, it is not limited to only the indication information of temporarily holding the source downlink tunnel, but can also be the information of the reason for switching the downlink tunnel of the user equipment, so that the CU-UP can continue sending the downlink data through the source downlink tunnel, increasing the flexibility in setting the holding indication information.

In a second aspect, embodiments of the application further provide a handover method, which includes: receiving, by a CU-UP, a notification sent by a CU-CP.

The notification includes: tunnel switching indication information used to indicate the CU-UP to switch a source downlink tunnel of a user equipment to a downlink tunnel corresponding to a target DU; and holding indication information used to indicate the CU-UP to continue sending downlink data through the source downlink tunnel.

The method further includes: switching, by the CU-UP, the source downlink tunnel of the user equipment to the downlink tunnel corresponding to the target DU according to the tunnel switching indication information in the notification; and continuing sending, by the CU-UP, downlink data through the source downlink tunnel according to the holding indication information in the notification.

With this method, the notification sent by the CU-CP to the CU-UP not only carries the tunnel switching indication information, but also includes the holding indication information. Through the tunnel switching indication information, the CU-UP can be indicated to switch the source downlink tunnel of the user equipment to the downlink tunnel corresponding to the target DU, so that the user equipment can receive the downlink data sent by the target DU after the user equipment is successfully connected to the target DU; and through the holding indication information, the CU-UP can be indicated to continue sending the downlink data through the source downlink tunnel, so that the user equipment can still receive the downlink data when it is not connected to the target DU, thereby reducing the interruption time of data transmission during the DU handover process and improving the user experience.

In one embodiment, the method further includes:
determining, by the CU-UP, time to start sending downlink data to the target DU through the downlink tunnel corresponding to the target DU.

Thus, the time when the CU-UP sends downlink data to the target DU can be determined.

In one embodiment, determining, by the CU-UP, time to start sending downlink data to the target DU through the downlink tunnel corresponding to the target DU, includes:

receiving, by the CU-UP, a detection message that is sent by a source DU and carries quality information of a radio link corresponding to the source DU; the source DU corresponding to the source downlink tunnel; and stopping, by the CU-UP, sending downlink data through the source downlink tunnel and starting to send downlink data to the target DU through the downlink tunnel corresponding to the target DU when the CU-UP determines that the quality of the radio link corresponding to the source DU meets a preset condition.

When the CU-UP switches the source downlink tunnel of the user equipment to the downlink tunnel corresponding to the target DU according to the tunnel switching indication information in the notification and can continue sending downlink data through the source downlink tunnel according to the holding indication information in the notification, the source DU continues sending the detection information carrying the quality information of the radio link corresponding to the source DU to the CU-UP on the user plane, so that the CU-UP can learn the quality status of the corresponding radio link. When the quality of the radio link meets the preset condition, the CU-UP can stop sending the downlink data through the source downlink tunnel, and send the downlink data through the downlink tunnel corresponding to the target DU to reduce the interruption time of data transmission during the DU handover process.

In one embodiment, determining, by the CU-UP, time to start sending downlink data to the target DU through the downlink tunnel corresponding to the target DU, includes:

stopping, by the CU-UP, sending downlink data through the source downlink tunnel and starting to send downlink data to the target DU through the downlink tunnel corresponding to the target DU when the CU-UP receives a connection success message sent by the target DU.

After the user equipment is successfully connected to the target DU, the target DU will send a connection success message to the CU-UP, so the CU-UP can stop sending data through the source downlink tunnel when receiving the connection success message, and send the downlink data through the downlink tunnel corresponding to the target DU to reduce the interruption time of data transmission during DU handover process.

In one embodiment, the holding indication information includes: indication information of temporarily holding the source downlink tunnel, which is used to indicate the CU-UP to temporarily hold the source downlink tunnel and continue sending downlink data through the source downlink tunnel; or information of a reason for switching the downlink tunnel of the user equipment being a cell handover, which is used to indicate the CU-UP to continue sending downlink data through the source downlink tunnel when the downlink tunnel is switched due to the cell handover.

In a third aspect, embodiments of the application further provide a handover apparatus. The handover apparatus is located in an access network device in which a CU and a DU are separated, and the CU includes a CU-CP and a CU-UP. The handover apparatus is for example CU-CP. The handover apparatus includes: a determining unit used by the CU-CP to determine a target DU for a user equipment; and a sending unit used by the CU-CP to send a notification to a CU-UP.

The notification includes: tunnel switching indication information and holding indication information, the tunnel switching indication information is used to indicate the CU-UP to switch a source downlink tunnel of the user equipment to a downlink tunnel corresponding to the target DU, and the holding indication information is used to indicate the CU-UP to continue sending downlink data through the source downlink tunnel.

In one embodiment, the holding indication information includes: indication information of temporarily holding the source downlink tunnel, which is used to indicate the CU-UP to temporarily hold the source downlink tunnel and continue sending downlink data through the source downlink tunnel; or information of a reason for switching the downlink tunnel of the user equipment being a cell handover, which is used to indicate the CU-UP to continue sending downlink data through the source downlink tunnel when the downlink tunnel is switched due to the cell handover.

In a fourth aspect, embodiments of the application further provide a handover apparatus, such as CU-UP, including: a receiving unit used by a CU-UP to receive a notification sent by a CU-CP.

The notification includes: tunnel switching indication information and holding indication information, the tunnel switching indication information is used to indicate the CU-UP to switch a source downlink tunnel of a user equipment to a downlink tunnel corresponding to a target DU, and the holding indication information is used to indicate the CU-UP to continue sending downlink data through the source downlink tunnel.

The apparatus further includes a switching unit used by the CU-UP to switch the source downlink tunnel of the user equipment to the downlink tunnel corresponding to the target DU according to the tunnel switching indication information in the notification; and a holding unit used by the CU-UP to continue sending downlink data through the source downlink tunnel according to the holding indication information in the notification.

In one embodiment, the apparatus further includes:

a determining unit used by the CU-UP to determine the time to start sending downlink data to the target DU through the downlink tunnel corresponding to the target DU.

In one embodiment, the determining unit is used by the CU-UP to: receive a detection message that is sent by a source DU and carries the quality information of a radio link corresponding to the source DU, the source DU corresponding to the source downlink tunnel; and stop sending downlink data through the source downlink tunnel and start to send downlink data to the target DU through the downlink tunnel corresponding to the target DU when the CU-UP determines that the quality of the radio link corresponding to the source DU meets a preset condition.

In one embodiment, the determining unit is used by the CU-UP to stop sending downlink data through the source downlink tunnel and start to send downlink data to the target DU through the downlink tunnel corresponding to the target DU when the CU-UP receives a connection success message sent by the target DU.

In one embodiment, the holding indication information includes: indication information of temporarily holding the source downlink tunnel, which is used to indicate the CU-UP to temporarily hold the source downlink tunnel and continue sending downlink data through the source downlink tunnel; or information of a reason for switching the downlink tunnel of the user equipment being a cell handover, which is used to indicate the CU-UP to continue sending downlink data through the source downlink tunnel when the downlink tunnel is switched due to the cell handover.

In a fifth aspect, embodiments of the application further provide a communication device, such as CU-CP, including:

a memory for storing program instructions; and a processor for invoking the program instructions stored in the memory, and in accordance with the program instructions, for:

determining a target DU for a user equipment; and sending a notification to a CU-UP.

The notification includes: tunnel switching indication information and holding indication information, the tunnel switching indication information is used to indicate the CU-UP to switch a source downlink tunnel of the user equipment to a downlink tunnel corresponding to the target DU, and the holding indication information is used to indicate the CU-UP to continue sending downlink data through the source downlink tunnel.

In one embodiment, the holding indication information includes: indication information of temporarily holding the source downlink tunnel, which is used to indicate the CU-UP to temporarily hold the source downlink tunnel and continue sending downlink data through the source downlink tunnel; or information of a reason for switching the downlink tunnel of the user equipment being a cell handover, which is used to indicate the CU-UP to continue sending downlink data through the source downlink tunnel when the downlink tunnel is switched due to the cell handover.

In a sixth aspect, embodiments of the application further provide a communication device, such as CU-UP, including:

a memory for storing program instructions; and a processor for invoking the program instructions stored in the memory, and in accordance with the program instructions, for:

receiving a notification sent by a CU-CP; the notification including: tunnel switching indication information for indicating the CU-UP to switch a source downlink tunnel of a user equipment to a downlink tunnel corresponding to a target DU, and holding indication information for indicating the CU-UP to continue sending downlink data through the source downlink tunnel; and switching the source downlink tunnel of the user equipment to the downlink tunnel corresponding to the target DU according to the tunnel switching indication information in the notification, and continuing sending downlink data through the source downlink tunnel according to the holding indication information in the notification.

In one embodiment, the processor is further for:

determining the time to start sending downlink data to the target DU through the downlink tunnel corresponding to the target DU.

In one embodiment, the processor is for: receiving a detection message that is sent by a source DU and carries the quality information of a radio link corresponding to the source DU, the source DU corresponding to the source downlink tunnel; and stopping sending downlink data through the source downlink tunnel and starting to send downlink data to the target DU through the downlink tunnel corresponding to the target DU when the CU-UP determines that the quality of the radio link corresponding to the source DU meets a preset condition.

In one embodiment, the processor is for: stopping sending downlink data through the source downlink tunnel and starting to send downlink data to the target DU through the downlink tunnel corresponding to the target DU when the CU-UP receives a connection success message sent by the target DU.

In one embodiment, the holding indication information includes: indication information of temporarily holding the source downlink tunnel, which is used to indicate the CU-UP to temporarily hold the source downlink tunnel and continue sending downlink data through the source downlink tunnel; or information of a reason for switching the downlink tunnel of the user equipment being a cell handover, which is used to indicate the CU-UP to continue sending downlink data through the source downlink tunnel when the downlink tunnel is switched due to the cell handover.

In a seventh aspect, embodiments of the application further provide a computer readable storage medium storing computer executable instructions. The computer executable instructions executed by the computer to perform any one of the above methods.

The present application has the following beneficial effects.

Embodiments of the application provide a handover method and apparatus. With this method, the notification sent by the CU-CP to the CU-UP not only carries the tunnel switching indication information, but also includes the holding indication information. Through the tunnel switching indication information, the CU-UP can be indicated to switch the source downlink tunnel of the user equipment to the downlink tunnel corresponding to the target DU, so that the user equipment can receive downlink data sent by the target DU after the user equipment is successfully connected to the target DU; and through the holding indication information, the CU-UP can be indicated to continue sending downlink data through the source downlink tunnel, so that the user equipment can still receive downlink data when it has not yet been successfully connected to the target DU, thereby reducing the interruption time of data transmission during the DU handover process and improving the user experience.

DETAILED DESCRIPTION OF THE EMBODIMENTS

The handover method and apparatus provided by embodiments of the application will be illustrated below in details with reference to the drawings. It is necessary to note that the described embodiments are only a part of the embodiments of the application, but not all the embodiments.

1. CU/DU separation architecture in access network device.

The CU is Central Unit, which can also be called central node; DU is Distribute Unit, which can also be called distributed node; the separation scheme of CU/DU is: Radio Resource Control (RRC) and Packet Data Convergence Protocol (PDCP) are deployed in the CU, and Radio Link Control (RLC), Media Access Control (MAC), physical layer and Radio Frequency (RF) are deployed in the DU(s).

Figure 1:
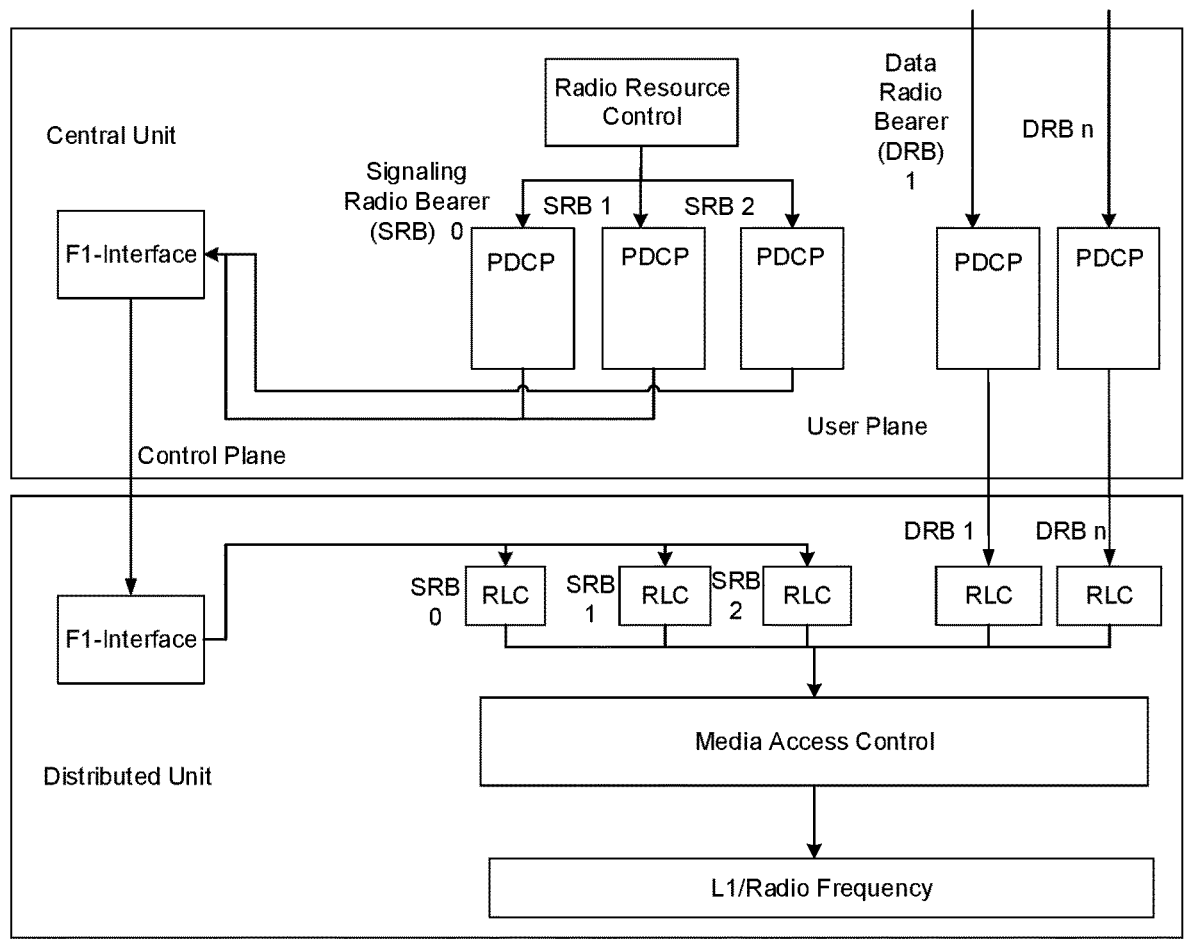
FIG. 1 is a structural schematic diagram in the CU/DU separation scenario.

As shown in FIG. 1, for the control plane signaling, in the CU, the RRC message is mapped into corresponding PDCP data stream through the PDCP layer, and then the PDCP data stream is included in the interface AP (Application Protocol) message of the CU/DU in the form of container and transmitted through the control plane. After receiving the data stream, the DU distributes it to the corresponding layer 2 entity, continues to process the data stream and sends it to a User Equipment (UE) through RF. Here, since the control plane adopts the Stream Control Transmission Protocol (SCTP) stack, the reliability of data transmission is guaranteed.

For the user plane data, a dedicated user plane tunnel is established between the CU and DU for each Data Radio Bearer (DRB). The CU processes the data corresponding to the DRB through the PDCP and then transfers it to the DU through the corresponding tunnel, here different DUs correspond to different tunnels, and one DU corresponds to one tunnel.

2. CU-CP/CU-UP separation architecture in CU.

The CP in the CU-CP is Control Plane, which can also be called control layer; and the UP in the CU-UP is User Plane, which can also be called user layer.

Figure 2:
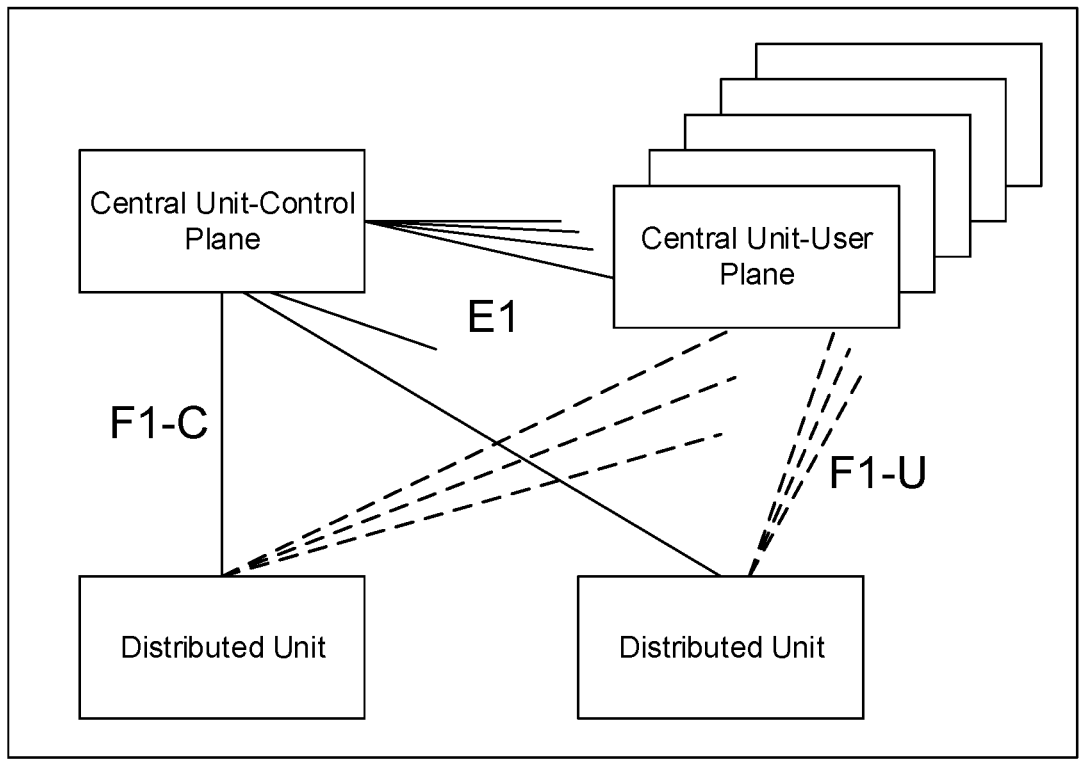
FIG. 2 is a structural schematic diagram in the CU-CP/CU-UP separation scenario.

As shown in FIG. 2, a base station may include: one CU-CP, a plurality of CU-UPs, and a plurality of DUs. The CU-CP is connected to a DU through an F1 control interface F1-C, A CU-UP is connected to a DU through an F1 user interface F1-U, a CU-UP is connected to the CU-CP through an interface E1. One DU can only be connected to one CU-CP, one CU-UP can only be connected to one CU-CP, one DU can be connected to a plurality of CU-UPs under the control of one CU-CP, and one CU-UP can be connected to a plurality of DUs under the control of one CU-CP.

The applicant found in the research that: in the CU/DU separation and CU-CP/CU-UP separation scenarios, when a UE switches from DU1 to DU2 under a base station, the corresponding CU-UP hands over the downlink tunnel according to the CU-CP command. Thus, when the UE accesses to the DU2, the DU1 sends no downlink data to the UE, but the DU2 cannot send and receive data because it has not successfully connected with the UE, which causes the long-term data transmission interruption and ultimately affects the user experience.

Based on this, embodiments of the application provide a handover method and apparatus, so as to reduce the interruption time of data transmission during the DU handover process and improve the user experience in a scenario where the CU-CP/CU-UP are separated.

The embodiments of the application will be illustrated below in combination with the drawings.

Specifically, embodiments of the application provide an access network device, which may include: a CU-CP and a CU-UP.

The CU-CP is configured to determine a target DU for a user equipment; and then send a notification to the CU-UP.

The CU-UP is configured to receive the notification sent by the CU-CP; and then switch the source downlink tunnel of the user equipment to the downlink tunnel corresponding to the target DU according to the tunnel switching indication information in the notification, and continue sending downlink data through the source downlink tunnel according to the holding indication information in the notification.

In one embodiment, in embodiments of the application, the notification sent by the CU-CP to the CU-UP may be sent in the form of bearer modification procedure message. The notification sent by the CU-CP to the CU-UP may include: tunnel switching indication information and holding indication information. The tunnel switching indication information is used to indicate the CU-UP to switch the source downlink tunnel of the user equipment to a downlink tunnel corresponding to the target DU, and the holding indication information is used to indicate the CU-UP to continue sending downlink data through the source downlink tunnel. The notification sent by the CU-CP can enable the CU-UP to switch the downlink tunnel of the user equipment according to the notification, and also can indicate the CU-UP to continue sending the downlink data through the source downlink tunnel to reduce the interruption time of data transmission during the DU handover process and improve the user experience.

It should be noted that there may be the following case in the actual DU handover process: the radio link quality of the source downlink tunnel can still meet the data transmission requirement in the process during which the CU-CP sends the notification to the CU-UP, but with passage of time, the radio link quality of the source downlink tunnel may also meet the data transmission requirement when the CU-UP prepares to perform the corresponding operations in accordance with the holding indication information in the notification after receiving the notification, so the CU-UP can continue sending the downlink data through the source downlink tunnel at this time to reduce the interruption time of data transmission during the DU handover process. If the radio link quality of the source downlink tunnel cannot meet the data transmission requirement when the CU-UP prepares to perform the corresponding operations in accordance with the holding indication information in the notification after receiving the notification, then the CU-UP can no longer continue sending the downlink data through the source downlink tunnel.

Therefore, after receiving the notification, CU-UP can continue sending the downlink data to the source downlink tunnel according to the holding indication information in the notification, but whether the sending can be successful is further related to the radio link quality of the source downlink tunnel.

In one embodiment, in embodiments of the application, the holding indication information included in the notification sent by the CU-CP to the CU-UP may be specifically: the indication information of temporarily holding the source downlink tunnel, which is used to indicate the CU-UP to temporarily hold the source downlink tunnel and continue sending the downlink data through the source downlink tunnel; or information of the reason of switching the downlink tunnel of the user equipment being a cell handover, which is used to indicate the CU-UP to continue sending the downlink data through the source downlink tunnel when the downlink tunnel is switched due to the cell handover.

In other words, the CU-CP can indicate the CU-UP to continue sending the downlink data through the source downlink tunnel in two ways. In the first way, the CU-CP can inform the CU-UP of the operation to be performed in an indirect way. For example, the CU-UP is informed in the holding indication information that the reason of switching the downlink tunnel of the user equipment is a cell handover, so that the CU-UP can continue sending the downlink data through the source downlink tunnel after knowing the reason clearly. In the second way, the CU-CP can explicitly specify the action to be performed by the CU-UP directly in the holding indication information, so that the CU-UP can temporarily holding the source downlink tunnel directly after receiving the holding indication information, and can continue sending the downlink data through the source downlink tunnel to thereby quicken the processing speed.

In one embodiment, in embodiments of the application, after the user equipment completes the connection with the target DU, the CU-UP needs to start sending the downlink data through the downlink tunnel corresponding to the target DU at this time to ensure the normal communication of the user equipment. Here, how to determine the time when the CU-UP starts sending the downlink data to the target DU through the downlink tunnel corresponding to the target DU becomes particularly important.

Specifically, when the time when the CU-UP starts sending the downlink data to the target DU through the downlink tunnel corresponding to the target DU is determined, two following implementations can be adopted.

In the first implementation, the time when the CU-UP starts sending the downlink data to the target DU through the downlink tunnel corresponding to the target DU is determined according to the quality information of the radio link corresponding to the source DU.

Here, for the user plane data, the CU-UP still sends the downlink data through the source downlink tunnel after receiving the notification sent by the CU-CP, and the source DU will continue sending the detection message carrying the quality information of the corresponding radio link to the CU-UP on the user plane; and the source DU corresponds to the source downlink tunnel.

When the CU-UP determines that the quality of the radio link corresponding to the source DU meets a preset condition (if the preset condition is: the quality of the radio link corresponding to the source DU is less than a threshold), that is to say, when the CU-UP finds that the quality of the radio link of the source downlink tunnel is very poor and the data can no longer be sent, the CU-UP determines that it can start to send the downlink data to the target DU through the downlink tunnel corresponding to the target DU, and stops sending the downlink data through the source downlink tunnel at the same time.

Of course, the preset condition mentioned in the above content of the embodiments of the application is not limited to the quality of the radio link corresponding to the source DU being less than the threshold, and may also be other condition, which is not limited here.

In the second implementation, the time when the CU-UP starts sending the downlink data to the target DU through the downlink tunnel corresponding to the target DU is determined according to the message of successful connection with the user equipment provided by the target DU.

Here, for the user plane data, the CU-UP still sends the downlink data through the source downlink tunnel after receiving the notification sent by the CU-CP, and the source DU will continue sending the detection message carrying the quality information of the corresponding radio link to the CU-UP on the user plane; and the source DU corresponds to the source downlink tunnel.

However, in this implementation, the time to start sending the downlink data to the target DU through the downlink tunnel corresponding to the target DU is not determined according to the quality of the radio link of the source downlink tunnel, so the CU-UP will not respond to the detection information even if it may receive the detection information sent by the source DU on the user plane.

Furthermore, when the user equipment is successfully connected to the target DU, the target DU can send a connection success message to the CU-UP to notify the CU-UP that it has completed the connection with the user equipment and can perform the data transmission; so the CU-UP can start sending the downlink data to the target DU through the downlink tunnel corresponding to the target DU, and stop sending the downlink data through the source downlink tunnel.

In a specific implementation, in order to determine the target DU for the user equipment, in embodiments of the application, the CU-CP can determine the target DU for the user equipment by using the following process.

Step 1: the user equipment sends a handover request message to the CU-CP.

Here, the handover request message carries the relevant information of the source DU, such as the identity of the source DU, the number of the downlink tunnel corresponding to the source DU, etc.; and the handover request message also carries the quality information of the radio links of surrounding cells, that is to say, the user equipment measures the radio link quality of the surrounding cells, and then aggregate the measurement results and send them to the CU-CP, so that the CU-CP can determine the target DU.

Step 2: the CU-CP selects a target cell that meets the condition according to the handover request, and sends a UE context setup request to the pending DU.

Here, the target cell that meets the condition can be understood as: the quality of the radio link of the target cell is better, and it can provide the high-quality business services. In addition, one base station includes a plurality of cells and one cell corresponds to one DU, so the DU corresponding to the target cell can be selected after the target cell is selected, where the DU corresponding to the target cell is called pending DU.

Step 3: the pending DU sends a feedback message to the CU-CP when determining that it can provide resources for the user equipment according to the UE context setup request.

Here, if the pending DU cannot provide resources and business services for the user equipment, it means that the pending DU is not the target DU, so the CU-CP needs to re-determine the pending DU, that is, continue to repeat the step 2; if the pending DU can provide resources and services for the user equipment, it can be determined that the pending DU is the target DU.

In addition, the way in which the pending DU determines that it can provide resources for the user equipment may be to establish the context of the user equipment, and if the establishment succeeds, it means that the resources can be provided for the user equipment.

Step 4: the CU-CP determines that the pending DU is the target DU after receiving the feedback message.

In a specific implementation and in embodiments of the application, after the CU-UP switches the downlink tunnel of the user equipment according to the tunnel switching indication information in the notification and continues sending the downlink data through the source downlink tunnel according to the holding indication information in the notification, there is a need to perform the connection process between the user equipment and the target DU. The following process may be specifically adopted.

Step 1: the CU-CP sends a UE context modification request message to the source DU.

Here, the UE context modification request message carries a Radio Resource Control container (RRC container).

Step 2: the source DU sends a Radio Resource Control reconfiguration (RRC reconfiguration) message to the user equipment.

Step 3: the user equipment sends a random access process to the target DU.

Here, the random access may be completed through a Radom Access Channel (RACH).

Step 4: the user equipment completes the access process, and sends a Radio Resource Control reconfiguration complete (RRC reconfiguration complete) message to the target DU to complete the connection with the target DU.

It should be noted that, in the embodiments of the application, after the CU-UP switches the downlink tunnel of the user equipment according to the tunnel switching indication information in the notification and can continue sending the downlink data through the source downlink tunnel according to the holding indication information in the notification, the connection process performed between the user equipment and the target DU can specifically refer to the connection process in the prior art, and the details thereof will be omitted here.

Figure 3:
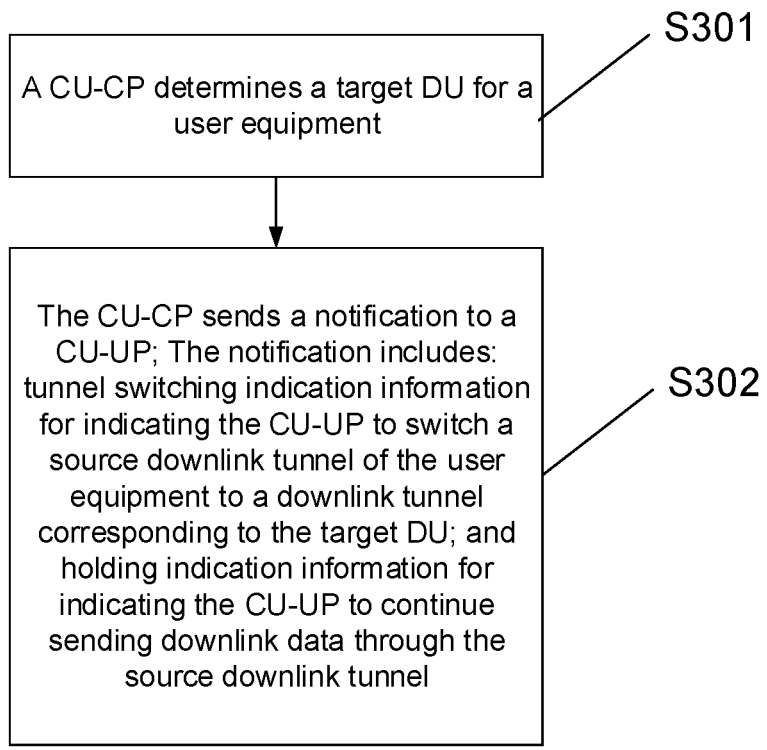
FIG. 3 is a flowchart of a handover method provided in an embodiment of the present application.

Based on the same concept, embodiments of the present application provide a handover method applied to the CU-CP side. As shown in FIG. 3, this handover method may include the following operations.

S301: a CU-CP determines a target DU for a user equipment.

Here, the step in which the CU-CP determines the target DU for the user equipment can be performed according to the measurement result of the radio link quality of the surrounding cells provided by the user equipment to the CU-CP. The details can refer to the above content, and the repeated description thereof will be omitted.

S302: the CU-CP sends a notification to a CU-UP. The notification includes: tunnel switching indication information and holding indication information, the tunnel switching indication information is used to indicate the CU-UP to switch a source downlink tunnel of the user equipment to a downlink tunnel corresponding to the target DU, and the holding indication information is used to indicate the CU-UP to continue sending the downlink data through the source downlink tunnel.

In addition, the process how the user equipment is connected to the target DU can refer to the above content, and the repeated description thereof will be omitted.

With this method, the notification sent by the CU-CP to the CU-UP not only carries the tunnel switching indication information, but also includes the holding indication information. Through the tunnel switching indication information, the CU-UP can be indicated to switch the source downlink tunnel of the user equipment to the downlink tunnel corresponding to the target DU, so that the user equipment can receive the downlink data sent by the target DU after the user equipment is successfully connected to the target DU; and through the holding indication information, the CU-UP can be indicated to continue sending the downlink data through the source downlink tunnel, so that the user equipment can still receive the downlink data when it is not connected to the target DU, thereby reducing the interruption time of data transmission during the DU handover process and improving the user experience.

In one embodiment, the holding indication information may include: the indication information of temporarily holding the source downlink tunnel, which is used to indicate the CU-UP to temporarily hold the source downlink tunnel and continue sending the downlink data through the source downlink tunnel; or information of the reason for switching the downlink tunnel of the user equipment being a cell handover, which is used to indicate the CU-UP to continue sending the downlink data through the source downlink tunnel when the downlink tunnel is switched due to the cell handover.

Therefore, when the content of the holding indication information is set, it is not limited to only the indication information of temporarily holding the source downlink tunnel, but can also be the reason information of switching the downlink tunnel of the user equipment, so that the CU-UP can continue sending the downlink data through the source downlink tunnel, increasing the flexibility in setting the holding indication information.

Figure 4:
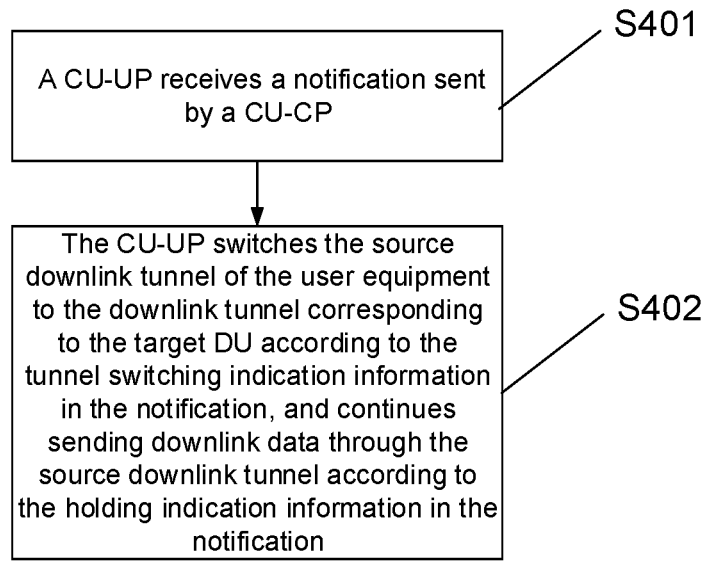
FIG. 4 is a flowchart of another handover method provided in an embodiment of the present application.

Based on the same concept, embodiments of the application provide a handover method applied to the CU-UP side. As shown in FIG. 4, this handover method may include the following operations.

S401: a CU-UP receives a notification sent by a CU-CP.

Here, the notification may include: tunnel switching indication information and holding indication information. The tunnel switching indication information is used to indicate the CU-UP to switch a source downlink tunnel of the user equipment to a downlink tunnel corresponding to the target DU, and the holding indication information is used to indicate the CU-UP to continue sending the downlink data through the source downlink tunnel.

S402: the CU-UP switches the source downlink tunnel of the user equipment to the downlink tunnel corresponding to the target DU according to the tunnel switching indication information in the notification, and continues sending the downlink data through the source downlink tunnel according to the holding indication information in the notification.

With this method, the notification sent by the CU-CP to the CU-UP not only carries the tunnel switching indication information, but also includes the holding indication information. Through the tunnel switching indication information, the CU-UP can be indicated to switch the source downlink tunnel of the user equipment to the downlink tunnel corresponding to the target DU, so that the user equipment can receive the downlink data sent by the target DU after the user equipment is successfully connected to the target DU; and through the holding indication information, the CU-UP can be indicated to continue sending the downlink data through the source downlink tunnel, so that the user equipment can still receive the downlink data when it is not connected to the target DU, thereby reducing the interruption time of data transmission during the DU handover process and improving the user experience.

In one embodiment, after the above step S402 in the embodiments of the application, the method may further include:

the CU-UP determines the time to start sending the downlink data to the target DU through the downlink tunnel corresponding to the target DU.

Thus, the time when the CU-UP sends the downlink data to the target DU can be determined.

In one embodiment, in embodiments of the application, the step in which the CU-UP determines the time to start sending the downlink data to the target DU through the downlink tunnel corresponding to the target DU may include that:

the CU-UP receives a detection message that is sent by a source DU and carries the quality information of a radio link corresponding to the source DU; the source DU corresponds to the source downlink tunnel; and the CU-UP stops sending the downlink data through the source downlink tunnel and starts to send the downlink data to the target DU through the downlink tunnel corresponding to the target DU when the CU-UP determines that the quality of the radio link corresponding to the source DU meets a preset condition.

After the above step S402, the source DU continues sending the detection information carrying the quality information of the corresponding radio link to the CU-UP on the user plane, so that the CU-UP can learn the quality status of the radio link of the source downlink tunnel. When the quality of the radio link meets the preset condition, the CU-UP can stop sending the downlink data through the source downlink tunnel, and send the downlink data through the downlink tunnel corresponding to the target DU to reduce the interruption time of data transmission during the DU handover process.

Specifically, in embodiments of the present application, the preset condition may be set as: the quality of the radio link corresponding to the source DU is less than a threshold, but is not limited to this; and the threshold may be set according to the actual situation to meet the requirements of various application scenarios.

In one embodiment, in embodiments of the present application, the step in which the CU-UP determines the time to start sending the downlink data to the target DU through the downlink tunnel corresponding to the target DU may include that:

the CU-UP stops sending the downlink data through the source downlink tunnel and starts to send the downlink data to the target DU through the downlink tunnel corresponding to the target DU when the CU-UP receives a connection success message sent by the target DU.

After the user equipment is successfully connected to the target DU, the target DU can send a connection success message to the CU-UP, so the CU-UP can stop sending the data through the source downlink tunnel when receiving the connection success message, and send the downlink data through the downlink tunnel corresponding to the target DU to reduce the interruption time of data transmission during DU handover process.

The above handover methods provided in the embodiments of the application will be described below in conjunction with specific embodiments.

Figure 5:
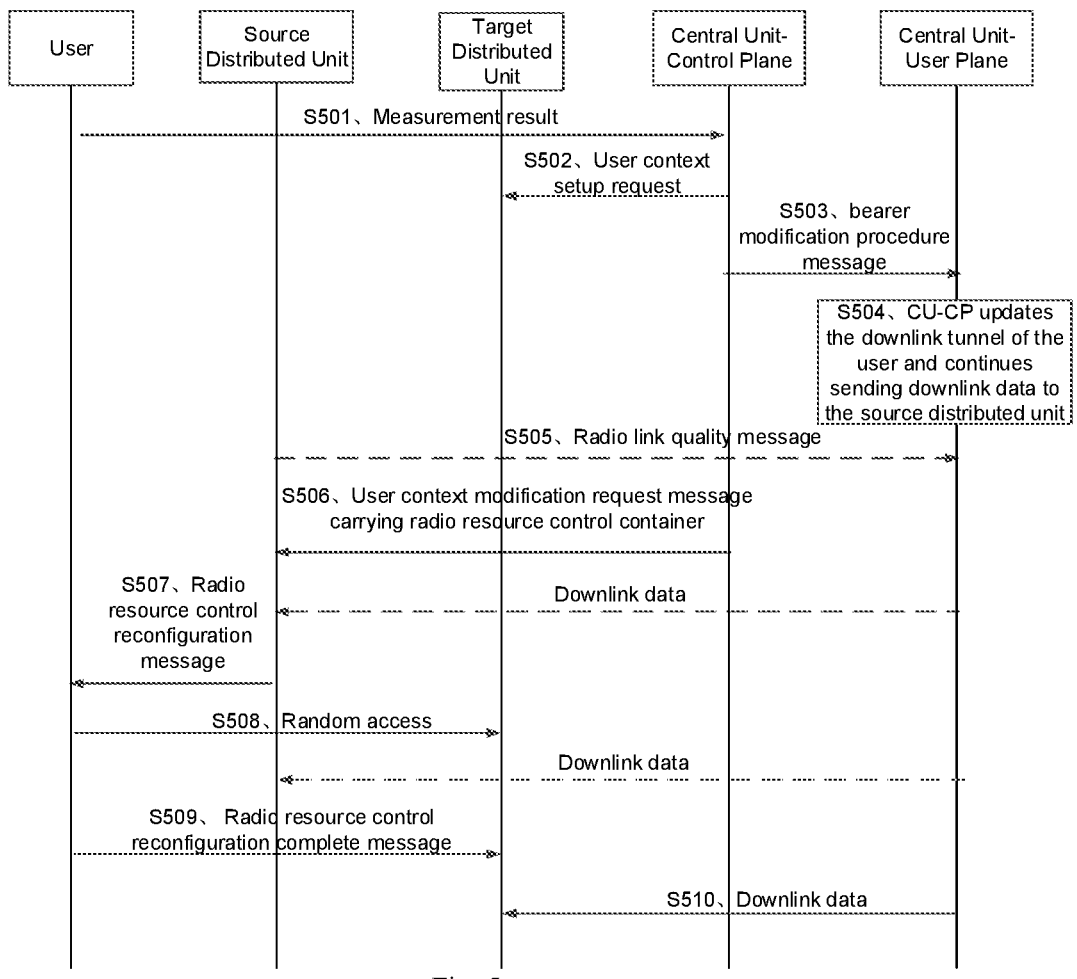
FIG. 5 is an interactive flowchart of a first embodiment.

First Embodiment: in combination with the interactive flowchart shown in FIG. 5, the case of determining the time for the CU-UP to start sending the downlink data to the target DU through the downlink tunnel corresponding to the target DU according to the quality information of the radio link corresponding to the source DU is taken as an example for illustration.

S501: a UE provides the CU-CP with a measurement result of the radio link quality of surrounding cells.

S502: the CU-CP selects a suitable target DU according to the measurement result, and sends a UE context setup request to the target DU for the target DU to establish the context of the UE.

S503: the CU-CP sends a bearer modification procedure message to the CU-UP.

S504: the CU-UP updates the downlink tunnel of the UE and can continue sending the downlink data to the source DU.

S505: the source DU sends a radio link quality message to the CU-UP.

S506: the CU-CP sends a UE context modification request message carrying the RRC container to the source DU.

S507: the source DU sends an RRC reconfiguration message to the UE.

S508: the UE initiates a random access process to the target DU.

S509: the UE completes the access process and sends an RRC reconfiguration complete message to the target DU.

S510: the CU-CP starts to send the downlink data to the target DU through the downlink tunnel corresponding to the target DU when the radio link quality corresponding to the source DU is relatively poor.

Figure 6:
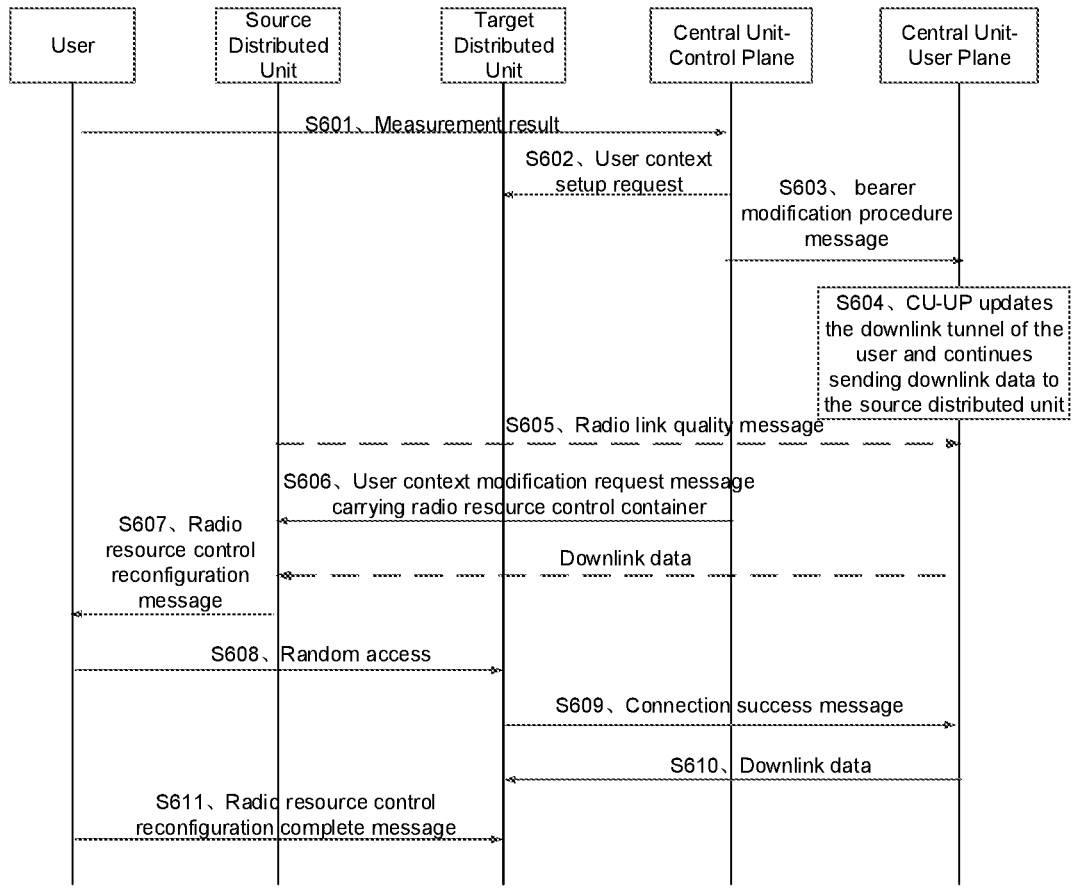
FIG. 6 is an interactive flowchart of a second embodiment.

Second Embodiment: in combination with the interactive flowchart shown in FIG. 6, the case of determining the time for the CU-UP to start sending the downlink data to the target DU through the downlink tunnel corresponding to the target DU according to the message of successful connection with the user equipment provided by the target DU is taken as an example for illustration.

S601: a UE provides the CU-CP with a measurement result of the radio link quality of surrounding cells.

S602: the CU-CP selects a suitable target DU according to the measurement result, and sends a UE context setup request to the target DU for the target DU to establish the context of the UE.

S603: the CU-CP sends a bearer modification procedure message to the CU-UP.

S604: the CU-UP updates the downlink tunnel of the UE and can continue sending the downlink data to the source DU.

S605: the source DU sends a radio link quality message to the CU-UP.

S606: the CU-CP sends a UE context modification request message carrying the RRC container to the source DU.

S607: the source DU sends an RRC reconfiguration message to the UE.

S608: the UE initiates a random access process to the target DU.

S609: the target DU sends a connection success message to the CU-UP after determining that the UE has successfully accessed.

S610: the CU-CP starts to send the downlink data to the target DU through the downlink tunnel corresponding to the target DU.

S611: the UE sends an RRC reconfiguration complete message to the target DU.

Figure 7:
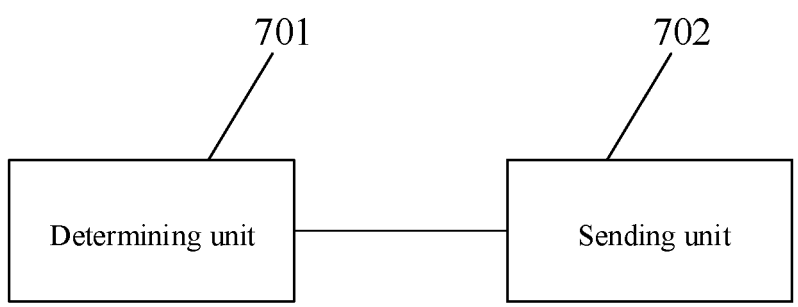
FIGS. 7 to 10 are respectively structural schematic diagrams of handover apparatuses provided in embodiments of the present application.

Based on the same concept, embodiments of the application further provide a handover apparatus, such as CU-CP. As shown in FIG. 7, the handover apparatus may include:

a determining unit 701 used by the CU-CP to determine a target DU for a user equipment; and a sending unit 702 used by the CU-CP to send a notification to a CU-UP.

The notification includes: tunnel switching indication information and holding indication information, the tunnel switching indication information is used to indicate the CU-UP to switch a source downlink tunnel of the user equipment to a downlink tunnel corresponding to the target DU, and the holding indication information is used to indicate the CU-UP to continue sending the downlink data through the source downlink tunnel.

In one embodiment, in embodiments of the application, the holding indication information includes: the indication information of temporarily holding the source downlink tunnel, which is used to indicate the CU-UP to temporarily hold the source downlink tunnel and continue sending the downlink data through the source downlink tunnel; or information of the reason for switching the downlink tunnel of the user equipment being a cell handover, which is used to indicate the CU-UP to continue sending the downlink data through the source downlink tunnel when the downlink tunnel is switched due to the cell handover.

Figure 8:
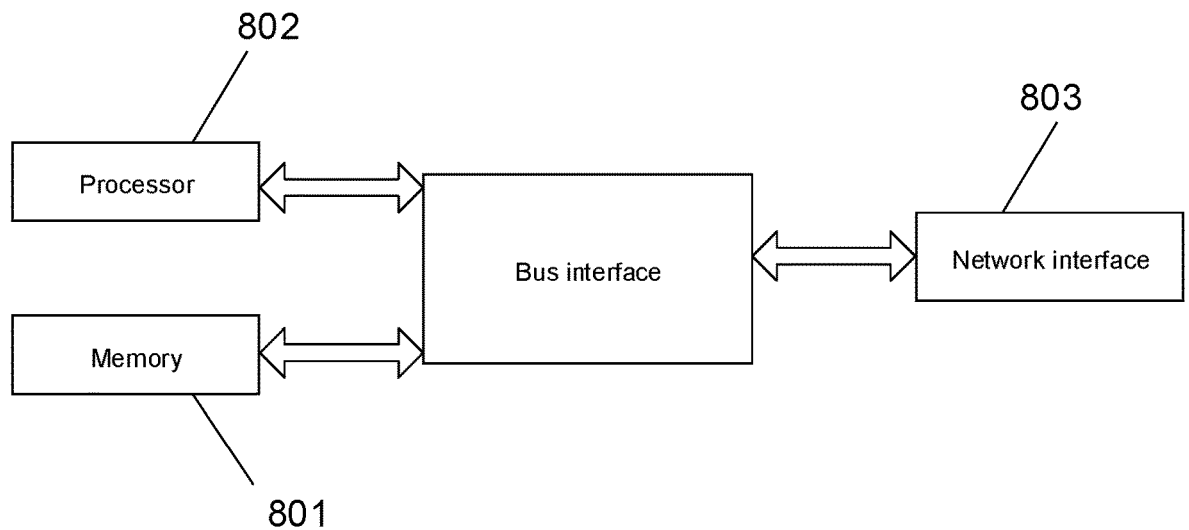

Based on the same concept, embodiments of the application further provide a communication device, such as CU-CP. As shown in FIG. 8, the communication device includes:

a memory 801 configured to store program instructions;

a processor 802 configured to invoke the program instructions stored in the memory, and in accordance with the obtained program, perform the process of:

determining a target DU for a user equipment; and sending a notification to a CU-UP.

the notification includes: tunnel switching indication information and holding indication information, the tunnel switching indication information is used to indicate the CU-UP to switch a source downlink tunnel of the user equipment to a downlink tunnel corresponding to the target DU, and the holding indication information is used to indicate the CU-UP to continue sending the downlink data through the source downlink tunnel.

In one embodiment, in embodiments of the application, the holding indication information includes: the indication information of temporarily holding the source downlink tunnel, which is used to indicate the CU-UP to temporarily hold the source downlink tunnel and continue sending the downlink data through the source downlink tunnel; or information of the reason for switching the downlink tunnel of the user equipment being a cell handover, which is used to indicate the CU-UP to continue sending the downlink data through the source downlink tunnel when the downlink tunnel is switched due to the cell handover.

In one embodiment, in embodiments of the application, the communication device may further include a network interface 803, which may be configured to send and receive data under the control of the processor 802.

Here, in FIG. 8, the bus architecture may include any numbers of interconnected buses and bridges, and specifically link various circuits of one or more processors represented by the processor 802 and the memory represented by the memory 801. The bus architecture may further link various other circuits such as peripheral device, voltage regulator and power management circuit, which are all well known in the art and thus will not be further described again herein. The bus interface provides an interface. The network interface 803 may be a plurality of elements, i.e., include a transmitter and a receiver, and provide the units for communicating with various other devices over the transmission media. For different user equipments, the user interface can also be the interface capable of inter-connecting or outer-connecting with the required devices, and the connected devices include but not limited to keypad, display, loudspeaker, microphone, joystick and the like.

The processor 802 is responsible for managing the bus architecture and general processing, and the memory 801 may store the data used by the processor 802 when performing the operations.

The processor 802 in the embodiments of the application may be Central Processing Unit (CPU), Application Specific Integrated Circuit (ASIC), Field-Programmable Gate Array (FPGA) or Complex Programmable Logic Device (CPLD).

Figure 9:
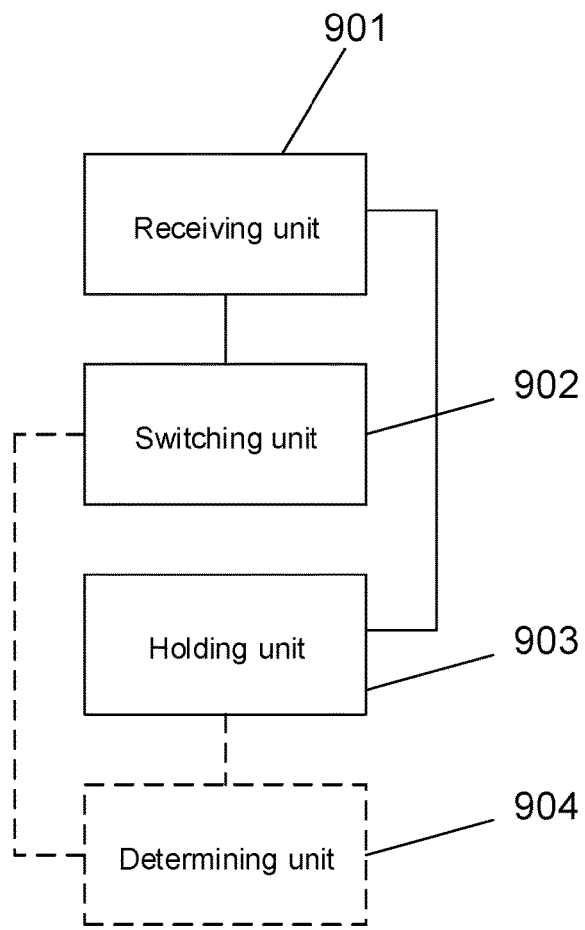

Based on the same concept, embodiments of the application further provide a handover apparatus, such as CU-UP. As shown in FIG. 9, the handover apparatus may include:

a receiving unit 901 used by the CU-UP to receive a notification sent by a CU-CP; herein the notification includes: tunnel switching indication information and holding indication information, the tunnel switching indication information is used to indicate the CU-UP to switch a source downlink tunnel of a user equipment to a downlink tunnel corresponding to a target DU, and the holding indication information is used to indicate the CU-UP to continue sending the downlink data through the source downlink tunnel;

a switching unit 902 used by the CU-UP to switch the source downlink tunnel of the user equipment to the downlink tunnel corresponding to the target DU according to the tunnel switching indication information in the notification; and a holding unit 903 used by the CU-UP to continue sending the downlink data through the source downlink tunnel according to the holding indication information in the notification.

In one embodiment, in embodiments of the application, as shown in FIG. 9, the handover apparatus may further include:

a determining unit 904 used by the CU-UP to determine the time to start sending the downlink data to the target DU through the downlink tunnel corresponding to the target DU.

In one embodiment, in embodiments of the present application, the determining unit 904 is used by the CU-UP to receive a detection message that is sent by a source DU and carries the quality information of a radio link corresponding to the source DU. The source DU corresponds to the source downlink tunnel. The determining unit 904 is used by the CU-UP to stop sending the downlink data through the source downlink tunnel and start to send the downlink data to the target DU through the downlink tunnel corresponding to the target DU when the CU-UP determines that the quality of the radio link corresponding to the source DU meets a preset condition.

In one embodiment, in embodiments of the application, the determining unit 904 is used by the CU-UP to stop sending the downlink data through the source downlink tunnel and start to send the downlink data to the target DU through the downlink tunnel corresponding to the target DU when the CU-UP receives a connection success message sent by the target DU.

Figure 10:
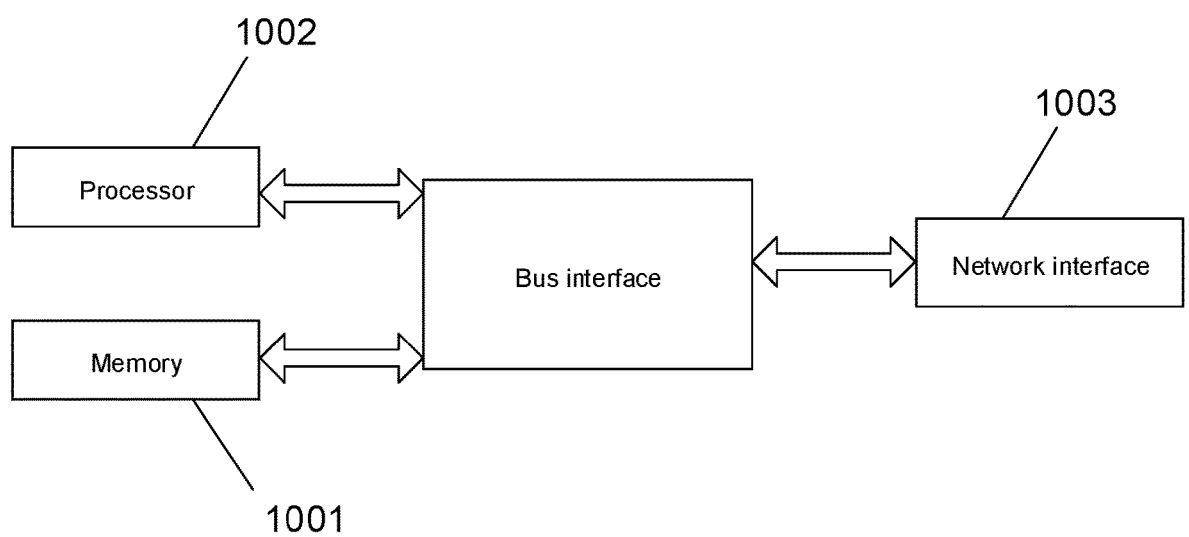

Based on the same concept, embodiments of the present application further provide a communication device, as shown in FIG. 10, which may include:

a memory 1001 configured to store program instructions;

a processor 1002 configured to invoke the program instructions stored in the memory, and in accordance with the obtained program, perform the process of:

receiving a notification sent by a CU-CP; herein the notification includes:

tunnel switching indication information and holding indication information, the tunnel switching indication information is used to indicate a CU-UP to switch a source downlink tunnel of a user equipment to a downlink tunnel corresponding to a target DU, and the holding indication information is used to indicate the CU-UP to continue sending the downlink data through the source downlink tunnel; and switching the source downlink tunnel of the user equipment to the downlink tunnel corresponding to the target DU according to the tunnel switching indication information in the notification, and continuing sending the downlink data through the source downlink tunnel according to the holding indication information in the notification.

In one embodiment, the processor is further configured to:

determine the time to start sending the downlink data to the target DU through the downlink tunnel corresponding to the target DU.

In one embodiment, the processor is configured to: receive a detection message that is sent by a source DU and carries the quality information of a radio link corresponding to the source DU; the source DU corresponding to the source downlink tunnel; and stop sending the downlink data through the source downlink tunnel and start to send the downlink data to the target DU through the downlink tunnel corresponding to the target DU when the CU-UP determines that the quality of the radio link corresponding to the source DU meets a preset condition.

In one embodiment, the processor is configured to: stop sending the downlink data through the source downlink tunnel and start to send the downlink data to the target DU through the downlink tunnel corresponding to the target DU when the CU-UP receives a connection success message sent by the target DU.

In one embodiment, the holding indication information includes: indication information of temporarily holding the source downlink tunnel, which is used to indicate the CU-UP to temporarily hold the source downlink tunnel and continue sending the downlink data through the source downlink tunnel; or information of a reason for switching the downlink tunnel of the user equipment being a cell handover, which is used to indicate the CU-UP to continue sending the downlink data through the source downlink tunnel when the downlink tunnel is switched due to the cell handover.

In one embodiment, in embodiments of the present application, the communication device may further include a network interface 1003, which may be configured to send and receive the data under the control of the processor 1002.

Here, in FIG. 10, the bus architecture may include any numbers of interconnected buses and bridges, and specifically link various circuits of one or more processors represented by the processor 1002 and the memory represented by the memory 1001. The bus architecture may further link various other circuits such as peripheral device, voltage regulator and power management circuit, which are all well known in the art and thus will not be further described again herein. The bus interface provides an interface. The network interface 1003 may be a plurality of elements, i.e., include a transmitter and a receiver, and provide the units for communicating with various other devices over the transmission media. For different user equipments, the user interface can also be the interface capable of inter-connecting or outer-connecting with the required devices, and the connected devices include but not limited to keypad, display, loudspeaker, microphone, joystick and the like.

The processor 1002 is responsible for managing the bus architecture and general processing, and the memory 1001 may store the data used by the processor 1002 when performing the operations.

The processor 1002 in the embodiments of the present application may be Central Processing Unit (CPU), Application Specific Integrated Circuit (ASIC), Field-Programmable Gate Array (FPGA) or Complex Programmable Logic Device (CPLD).

It should be pointed out that any memory mentioned in the embodiments of the present application may include a Read-Only Memory (ROM) and a Random Access Memory (RAM), and provide the program instructions and data stored in the memory to the processor. In embodiments of the present application, the memory may be used to store the program of any one of the methods provided by the embodiments of the present application. The processor invokes the program instructions stored in the memory and is configured to perform any one of the methods provided by the embodiments of the present application in accordance with the obtained program instructions.

Based on the same concept, embodiments of the application further provide a computer readable storage medium storing computer executable instructions, which are configured to cause a computer to perform any one of the above methods.

The computer readable storage medium may be any available media or data storage device accessible to the computer, including but not limited to magnetic memory (e.g., floppy disk, hard disk, magnetic tape, Magnetic Optical disc (MO) or the like), optical memory (e.g., Compact Disc (CD), Digital Video Disc (DVD), Blu-ray Disc (BD), High-definition Versatile Disc (HVD) or the like), semiconductor memory (e.g., ROM, Erasable Programmable Read Only Memory (EPROM), Electrically Erasable Programmable Read Only Memory (EEPROM), nonvolatile memory (NAND FLASH), Solid State Disk (SSD)) or the like.

It should be noted that the user equipment mentioned in the embodiments of the present application may also referred to as terminal, Mobile Station ("MS" for short), Mobile Terminal or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The access network device may be a base station (e.g., access point), which means the device in the access network communicating with the wireless terminal via one or more sectors over the air interface. The base station may be used to perform the inter-conversion between the received air frame and the Internet Protocol (IP) packet, and used as the router between the wireless terminal and the rest of the access network, wherein the rest of the access network may include IP networks. The base station may further coordinate the attribute management of the air interface. For example, the base station may be the Base Transceiver Station (BTS) in the Global System for Mobile communications (GSM) or Code Division Multiple Access (CDMA), or may be the NodeB in the Wideband Code Division Multiple Access (WCDMA), or may be the evolutional Node B (NodeB or eNB or e-NodeB) in the LTE, which is not limited in the embodiments of the invention.

The processing flows of the above methods may be implemented by a software program, which may be stored in a storage medium. When the stored software program is invoked, the above method steps are performed.

Embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the embodiments of the present application have been described, those skilled in the art can make additional alterations and modifications to these embodiments once they learn about the basic creative concepts. Thus the attached claims are intended to be interpreted to include the embodiments as well as all the alterations and modifications falling within the scope of the present application.

The embodiments of the present application provide a handover method and apparatus. With this method, the notification sent by the CU-CP to the CU-UP not only carries the tunnel switching indication information, but also includes the holding indication information. Through the tunnel switching indication information, the CU-UP can be indicated to switch the source downlink tunnel of the user equipment to the downlink tunnel corresponding to the target DU, so that the user equipment can receive the downlink data sent by the target DU after the user equipment is successfully connected to the target DU; and through the holding indication information, the CU-UP can be indicated to continue sending the downlink data through the source downlink tunnel, so that the user equipment can still receive the downlink data when it is not connected to the target DU, thereby reducing the interruption time of data transmission during the DU handover process and improving the user experience.

What is claimed is:

1. A handover method, applied to an access network device in which a Central Unit (CU) and a Distributed Unit (DU) are separated, wherein the CU comprises a Central Unit-Control Plane (CU-CP) and a Central Unit-User Plane (CU-UP), and the method comprises:
   determining, by the CU-CP, a target DU for a user equipment; and
   sending, by the CU-CP, a notification to the CU-UP; wherein the notification comprises:
   tunnel switching indication information, for indicating the CU-UP to switch a source downlink tunnel of the user equipment to a downlink tunnel corresponding to the target DU; and
   holding indication information, for indicating the CU-UP to continue sending downlink data through the source downlink tunnel.

2. The method according to claim 1, wherein the holding indication information comprises:
   indication information of temporarily holding the source downlink tunnel, for indicating the CU-UP to temporarily hold the source downlink tunnel and continue sending downlink data through the source downlink tunnel; or
   information of a reason for switching a downlink tunnel of the user equipment being a cell handover, for indicating the CU-UP to continue sending downlink data through the source downlink tunnel when the downlink tunnel is switched due to the cell handover.

3. A communication device, comprising:
   a memory for storing program instructions;
   a processor for invoking the program instructions stored in the memory, and in accordance with the program instructions, for
   performing the handover method according to claim 1.

4. A computer readable storage medium storing computer executable instructions, wherein the computer executable instructions executed by a computer are for performing the method of claim 1.

5. A handover method, comprising:
   receiving, by a Central Unit-User Plane (CU-UP), a notification sent by a Central Unit-Control Plane (CU-CP); wherein the notification comprises:
   tunnel switching indication information, for indicating the CU-UP to switch a source downlink tunnel of a user equipment to a downlink tunnel corresponding to a target Distributed Unit (DU); and
   holding indication information, for indicating the CU-UP to continue sending downlink data through the source downlink tunnel; and
   switching, by the CU-UP, the source downlink tunnel of the user equipment to the downlink tunnel corresponding to the target DU according to the tunnel switching indication information in the notification, and continuing sending, by the CU-UP, downlink data through the source downlink tunnel according to the holding indication information in the notification.

6. The method according to claim 5, further comprising:
   determining, by the CU-UP, time to start sending downlink data to the target DU through the downlink tunnel corresponding to the target DU.

7. The method according to claim 6, wherein said determining, by the CU-UP, time to start sending downlink data to the target DU through the downlink tunnel corresponding to the target DU, comprises:
   receiving, by the CU-UP, a detection message that is sent by a source DU and carries quality information of a radio link corresponding to the source DU; wherein the source DU corresponds to the source downlink tunnel;
   stopping, by the CU-UP, sending downlink data through the source downlink tunnel and starting to send downlink data to the target DU through the downlink tunnel corresponding to the target DU when the CU-UP determines that quality of the radio link corresponding to the source DU meets a preset condition.

8. The method according to claim 7, wherein the holding indication information comprises:
   indication information of temporarily holding the source downlink tunnel, for indicating the CU-UP to temporarily hold the source downlink tunnel and continue sending downlink data through the source downlink tunnel; or information of a reason for switching a downlink tunnel of the user equipment being a cell handover, for indicating the CU-UP to continue sending downlink data through the source downlink tunnel when the downlink tunnel is switched due to the cell handover.

9. The method according to claim 6, wherein, said determining, by the CU-UP, time to start sending downlink data to the target DU through the downlink tunnel corresponding to the target DU, comprises:

stopping, by the CU-UP, sending downlink data through the source downlink tunnel and starting to send downlink data to the target DU through the downlink tunnel corresponding to the target DU when the CU-UP receives a connection success message sent by the target DU.

10. The method according to claim 9, wherein the holding indication information comprises:

indication information of temporarily holding the source downlink tunnel, for indicating the CU-UP to temporarily hold the source downlink tunnel and continue sending downlink data through the source downlink tunnel; or information of a reason for switching a downlink tunnel of the user equipment being a cell handover, for indicating the CU-UP to continue sending downlink data through the source downlink tunnel when the downlink tunnel is switched due to the cell handover.

11. The method according to claim 6, wherein the holding indication information comprises:

indication information of temporarily holding the source downlink tunnel, for indicating the CU-UP to temporarily hold the source downlink tunnel and continue sending downlink data through the source downlink tunnel; or information of a reason for switching a downlink tunnel of the user equipment being a cell handover, for indicating the CU-UP to continue sending downlink data through the source downlink tunnel when the downlink tunnel is switched due to the cell handover.

12. The method according to claim 5, wherein the holding indication information comprises:

indication information of temporarily holding the source downlink tunnel, for indicating the CU-UP to temporarily hold the source downlink tunnel and continue sending downlink data through the source downlink tunnel; or information of a reason for switching a downlink tunnel of the user equipment being a cell handover, for indicating the CU-UP to continue sending downlink data through the source downlink tunnel when the downlink tunnel is switched due to the cell handover.

13. A computer readable storage medium storing computer executable instructions, wherein the computer executable instructions executed by a computer are for performing the method of claim 5.

14. A communication device, comprising:

a memory for storing program instructions;

a processor for invoking the program instructions stored in the memory, and in accordance with the program instructions, for:

receiving a notification sent by a Central Unit-Control Plane (CU-CP); wherein the notification comprises:

tunnel switching indication information, for indicating a Central Unit-User Plane (CU-UP) to switch a source downlink tunnel of a user equipment to a downlink tunnel corresponding to a target Distributed Unit (CU); and holding indication information, for indicating the CU-UP to continue sending downlink data through the source downlink tunnel; and switching the source downlink tunnel of the user equipment to the downlink tunnel corresponding to the target DU according to the tunnel switching indication information in the notification, and continuing sending downlink data through the source downlink tunnel according to the holding indication information in the notification.

15. The device according to claim 14, wherein the processor is further for:

determining time to start sending downlink data to the target DU through the downlink tunnel corresponding to the target DU.

16. The device according to claim 15, wherein the processor is for:

receiving a detection message that is sent by a source DU and carries quality information of a radio link corresponding to the source DU; wherein the source DU corresponds to the source downlink tunnel; and stopping sending downlink data through the source downlink tunnel and start to send downlink data to the target DU through the downlink tunnel corresponding to the target DU when the CU-UP determines that quality of the radio link corresponding to the source DU meets a preset condition.

17. The device according to claim 16, wherein the holding indication information comprises:

indication information of temporarily holding the source downlink tunnel, for indicating the CU-UP to temporarily hold the source downlink tunnel and continue sending downlink data through the source downlink tunnel; or information of a reason for switching a downlink tunnel of the user equipment being a cell handover, for indicating the CU-UP to continue sending downlink data through the source downlink tunnel when the downlink tunnel is switched due to the cell handover.

18. The device according to claim 15, wherein the processor is for:

stopping sending downlink data through the source downlink tunnel and starting to send downlink data to the target DU through the downlink tunnel corresponding to the target DU when the CU-UP receives a connection success message sent by the target DU.

19. The device according to claim 15, wherein the holding indication information comprises:

indication information of temporarily holding the source downlink tunnel, for indicating the CU-UP to temporarily hold the source downlink tunnel and continue sending downlink data through the source downlink tunnel; or information of a reason for switching a downlink tunnel of the user equipment being a cell handover, for indicating the CU-UP to continue sending downlink data through the source downlink tunnel when the downlink tunnel is switched due to the cell handover.

20. The device according to claim 14, wherein the holding indication information comprises:

indication information of temporarily holding the source downlink tunnel, for indicating the CU-UP to temporarily hold the source downlink tunnel and continue sending downlink data through the source downlink tunnel; or information of a reason for switching a downlink tunnel of the user equipment being a cell handover, for indicating the CU-UP to continue sending downlink data through the source downlink tunnel when the downlink tunnel is switched due to the cell handover.

* * * * *